May 7, 1968 J. G. GETSINGER 3,382,059
PRODUCTION OF AMMONIUM POLYPHOSPHATES FROM WET
PROCESS PHOSPHORIC ACID
Filed July 2, 1964
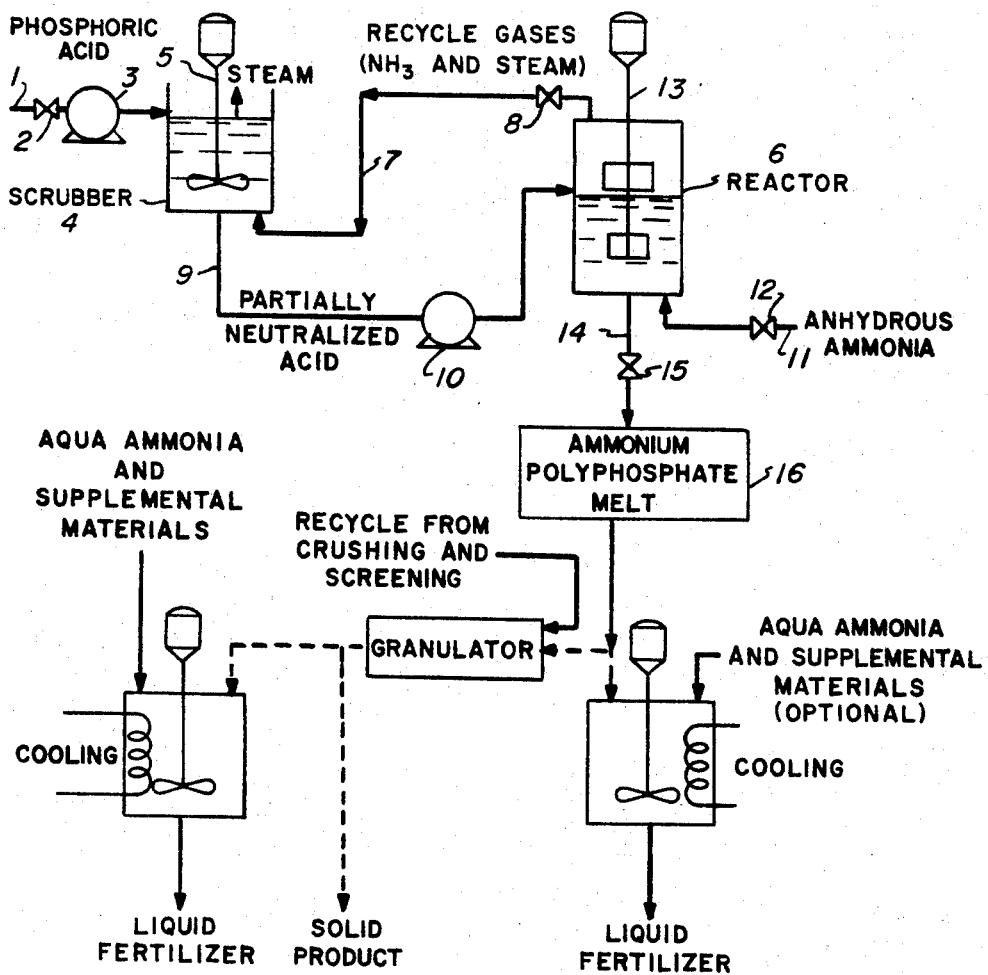
PRODUCTION AND UTILIZATION OF AMMONIUM POLYPHOSPHATE
BY CONTINUOUS AMMONIATION OF PHOSPHORIC ACID
John G. Getsinger INVENTOR.
BY Robert A. Petruck
    agent 3,382,059
PRODUCTION OF AMMONIUM POLYPHOSPHATES FROM WET PROCESS PHOSPHORIC ACID
John G. Getsinger, Florence, Ala., assignor to Tennessee Valley Authority, a corporation of the United States
Filed July 2, 1964, Ser. No. 380,743
8 Claims. (Cl. 71—34)

ABSTRACT OF THE DISCLOSURE

A process for the production of ammonium polyphosphate consists of simultaneously introducing ammonia and partially ammoniated wet-process phosphoric acid into a reactor, thereby forming a melt of ammonium polyphosphates. The melt is withdrawn from the reactor as product. The reactor offgas, containing unreacted ammonia, is passed through a scrubber countercurrent to a stream of wet-process phosphoric acid, thereby recovering ammonia from the offgas. The scrubber liquor, comprised of partially ammoniated acid, is fed to the reactor.

---

The invention herein described may be manufactured and used by or for the Government for governmental purposes without payment to me of any royalty thereon.

My invention relates to an improvement in liquid and solid fertilizers and an improved process for their production; more particularly to a process for the manufacture of highly concentrated liquid and solid mixed fertilizers produced directly from the ammoniation of phosphoric acid of the wet-process type; and still more particularly to the production of such highly concentrated liquid and solid mixed fertilizers by the ammoniation of wet-process phosphoric acid wherein the previously required separate step of concentrating said wet-process phosphoric acid up to the range of superphosphoric acid is entirely eliminated.

Liquid mixed fertilizers having compositions similar to those of standard dry mixed fertilizers are well known in the industry and are increasing in popularity. Such solutions have the advantages over dry mixed fertilizers in that costs of evaporating water and bagging are eliminated and application to the soil is greatly simplified. Moreover, the use of liquid fertilizers eliminates difficulty due to segregation and caking often encountered in the storing of dry fertilizers.

However, liquid fertilizers have had some outstanding disadvantages. Raw-material costs have been relatively high and the solutions produced have, in the past, been so corrosive as to result in high maintenance and storage costs. The solutions also, in the past, have been limited to a maximum plant food content of about 33 percent by weight because experience has taught that concentration in excess of this amount always has resulted in crystallization and precipitation of salts. These disadvantages, in many instances, outweighed the benefits derived by elimination of the evaporation and bagging steps.

One of several recent breakthroughs in overcoming these disadvantages in liquid mixed fertilizers is taught and described in U.S. Patent 2,950,961, Striplin et al. Striplin has discovered that he is able to prepare a liquid mixed fertilizer containing substantial values of both N and $P_2O_5$ in a process wherein he rapidly and intimately introduces ammonia and superphosphoric acid into a reaction vessel under controlled conditions. As is taught by Striplin, the superphosphoric acid utilized in his process is ammoniated in such a way that the resulting ammonium polyphosphate salts which comprise his liquid fertilizers are proportioned in his product in substantially the same dependent and proportional relationship as are the various species of polyphosphoric acids originally present in his superphosphoric acid constituent. It is believed that the retention of these species of non-equilibrated polyphosphoric acids as the ammonium salts thereof is beneficial in restraining the precipitation of salts in his product solution.

In another fairly recent breakthrough in overcoming the disadvantages of liquid mixed fertilizers produced by the prior-art methods, there is found in my application Ser. No. 835,377, John G. Getsinger, assigned to the assignee of the present application, the discovery that if phosphoric acid of the wet-process type containing up to a maximum of about 54 percent $P_2O_5$ is subjected to evaporating means, either at atmospheric or at reduced pressure, so as to condense the wet acid and raise its $P_2O_5$ content up to the range of approximately 60 to 76 percent $P_2O_5$, the formation of gelatinous precipitates which otherwise render wet-process phosphoric acid unusable for the preparation of high-analysis liquid mixed fertilizers are substantially sequestered. In addition, there is taught in said application that if wet-process phosphoric acid is so concentrated, it may then be subsequently ammoniated to form liquid mixed fertilizers in which the congeneric impurities orignally present in said wet-process phosphoric acid are sequestered and caused to remain in solution, thereby eliminating the formation of said gelatinous precipitates. Substantially the same teachings wherein commercial grade wet-process phosphoric acid is concentrated and then subsequently ammoniated to form liquid mixed fertilizers is also found in U.S. Patent 3,044,851, D. C. Young. As may be seen from the disclosures enumerated supra, it is now known in the art how to produce liquid mixed fertilizers having plant nutrient values comparable to many standard dry mixed fertilizers and, in addition, to the preparation of said liquid fertilizers by such means and in such forms so as to substantially overcome many of the disadvantages originally inherent in the production of liquid fertilizers prior to the Striplin disclosure. As may also be seen from a consideration of the economics involved, it is, in many cases, more highly desirable to produce such liquid mixed fertilizers by the ammoniation of concentrated wet-process super acid rather than from the ammoniation of the cleaner, but more highly expensive, superphosphoric acid of the electric furnace type. Experience has shown in the past few years that the balance of the economic considerations as to which of the types of superphosphoric acid are more economically desirable as the starting cnstituent are dictated in a great degree by the cost of the equipment involved and the fuel required in concentrating the wet-process acid from its usual commercial concentration of approximately 54 percent $P_2O_5$ up to the superphosphoric range. This has been found to be true largely due to such factors as the cost of installing evaporator means, the availability in different locales of a supply of low-priced fuel, and the balance between short-distance freight rates and long-distance freight rates.

And in still another fairly recent breakthrough in overcoming some of the disadvantages of liquid and solid mixed fertilizers produced by the prior-art methods, there is found in application Ser. No. 227,664 now U.S. Patent 3,228,752, Travis P. Hignett and John G. Getsinger, assigned to the assignee of the present application, the discovery of a new composition of matter which contains up to about 80 percent of its weight in the form of available plant food and which is produced by a process of directly reacting anhydrous ammonia with superphosphoric acid at elevated temperatures and pressures. This composition of matter may either be directly applied to the soil as a solid fertilizer or, due to its superior solubility characteristics, may be shipped from the point of manufacture to about the intended point of usage and then subsequently simply be dissolved in water, thereby effecting the production of high-analysis liquid mixed fertilizer suitable for application to the soil. In this teaching of Hignett and Getsinger, the feed material for the reactor is anhydrous ammonia and superphosphoric acid, either of the electric-furnace type or wet-process type. It has been found that in order for the desired material to be produced, the feed acid should contain substantially not less than 74 percent $P_2O_5$. This requirement necessitates, when said super acid is derived from the leaching of phosphate rock by sulfuric acid, i.e., wet acid, of concentrating the ordinary or merchant grade wet acid (54 percent $P_2O_5$ maximum) up to the super acid range by means of a separate and fairly costly concentration step in that special equipment and materials of construction must be used to insure against the corrosive characteristics of acid so concentrated, and in the thermal requirements from the fuel to be used therein.

I have developed a process for the production of highly concentrated liquid and solid mixed fertilizers produced by the ammoniation of phosphoric acid of the wet-process type which overcomes certain of these disadvantages of the prior art and which will greatly influence an economic swing to the use of wet acid as the starting constituent rather than the more highly priced electric furnace type acid. I have developed a reliable, simple, and efficient method for the production of liquid and solid fertilizers by utilizing ordinary wet-process phosphoric acid in the $P_2O_5$ content range from about 30 to about 54 percent by weight wherein the separate step of subjecting said acid to an evaporating step is substantially eliminated, thereby greatly improving on the economics involved.

Further, I have found that, in carrying out my process for the manufacture of liquid and solid mixed fertilizers by the ammoniation of wet-process phosphoric acid, I can utilize the free heat of ammoniation to evaporate water and thereby condense the acid rather than require the use of expensive heat from fuel. My process accomplishes the two functions of ammoniation and concentration simultaneously instead of using two separate processes. Further, my invention utilizes the evaporation of water to give the necessary cooling of the ammoniation reaction instead of using a separate, more expensive cooling medium. In addition, in my process the evaporation water is from a relatively noncorrosive acid salt solution instead of from a highly corrosive acid, thus allowing the use of less expensive materials of construction when carrying out my process.

It is therefore an object of the present invention to produce improved stable liquid and solid mixed fertilizers containing upwards of about 45 percent total $(N+P_2O_5)$ in the liquids and about 70 percent in the solids by a process employing the ammoniation of wet-process phosphoric acid and which liquid fertilizers form substantially no precipitates upon standing and storage.

Another object of the present invention is to provide improved stable liquid and solid mixed fertilizers containing upwards of about 45 percent $(N+P_2O_5)$ in the liquids and about 70 percent in the solids by a process employing the ammoniation of wet-process phosphoric acid and which liquid fertilizers form substantially no precipitates upon standing and storage, and which wet-process phosphoric acid incorporated in my method contains a maximum of approximately 54 percent $P_2O_5$ prior to incorporation therein, thereby eliminating a separate concentrating step of raising the $P_2O_5$ content of said starting acid up to the superphosphoric range.

Still another object of the present invention is to provide improved stable liquid and solid mixed fertilizers containing upwards of about 45 percent $(N+P_2O_5)$ in the liquids and about 70 percent in the solids directly from the ammoniation of commercial grade wet-process phosphoric acid containing a maximum of approximately 54 percent $P_2O_5$ by a relatively simple integrated process which simultaneously accomplishes the two functions of concentration and ammoniation, and which process further utilizes simultaneously, along with said concentration and ammoniation functions, the evaporation of water present in said acid in such a manner as to provide the necessary cooling of the ammoniation reaction, thereby eliminating the use of a separate, more expensive cooling medium.

A further object of the present invention is to provide improved stable liquid and solid mixed fertilizers containing upwards of about 45 percent $(N+P_2O_5)$ in the liquids and about 70 percent in the solids directly from the ammoniation of commercial grade wet-process phosphoric acid containing a maximum of approximately 54 percent $P_2O_5$ by a relatively simple integrated process which simultaneously accomplishes the two functions of concentration and ammoniation, and which process further utilizes simultaneously, along with said concentration and ammoniation functions, the evaporation of water present in said acid in such a manner as to provide the necessary cooling of the ammoniation reaction, thereby eliminating the use of a separate, more expensive cooling medium, and in which process the evaporation of said water is from a relatively noncorrosive acid salt solution rather than from a highly corrosive acid, thereby allowing the use of less expensive materials of construction for the practicing of my process.

I have discovered that the foregoing and other objects of the present invention can be attained by a process for the manufacture of improved stable liquid and solid mixed fertilizers from the ammoniation of ordinary commercial grade wet-process phosphoric acid wherein the concentration and ammoniation of the wet-process phosphoric acid is combined and, further, wherein the resulting acyclic ammonium polyphosphates are made directly and continuously in situ by removal of free water from the system and by dehydration of the orthophosphoric acid which originally comprised the wet acid constituent. Thus, the novelty in my process resides in the combination of the simultaneous concentration, dehydration, and ammoniation of commercial grade wet-process phosphoric acid. In addition, my process eliminates the offgas fume problem generally associated with the prior art process of concentrating wet acid up to the super acid range such as in the submerged combustion process of D. C. Young.

In carrying out the objects of my invention in one form thereof, water is first removed from the system by the heat of ammoniation while ammonium orthophosphate salts are formed by the initial ammoniation of wet-process orthophosphoric acid. As the free water is being removed and the ammoniation continues to further degrees, dehydration of the so-formed orthophosphate occurs as further ammonia is added to said orthophosphate and this further dehydration of the orthophosphate by the heat of ammoniation causes the appearance of the pyrophosphate, the tripolyphosphate, and higher species of the acyclic polyphosphoric acids in the system which, upon further ammoniation, causes the conversion of same to the ammonium salts thereof.

With respect to the individual molecule, the chemical and physical operations described above, of course, take place in stages. However, in this process all of the operations are occurring simultaneously and continuously and this phenomena constitutes the novelty of my process, whereas in processes of the prior art there is followed the stagewise and stepwise production of the polyphosphates, which eventually comprise the liquid mixed fertilizers by the following three steps: (1) concentration, (2) dehydration, and (3) ammoniation.

My invention, together with further objects and advantages thereof, will be better understood from a consideration of the following description taken in connection with the accompanying drawing in which:

The drawing is a flowsheet illustrating the principles of my novel process which results in the direct production of high-analysis, stable liquid and solid mixed fertilizers by the simultaneous concentration, dehydration, and ammoniation of wet-process phosphoric acid having an initial maximum $P_2O_5$ content of approximately 54 percent $P_2O_5$.

Referring now more specifically to the drawing, it can be seen that my process is essentially a countercurrent process for ammoniating the commercial grade wet-process phosphoric acid. Wet-process phosphoric acid from a source not shown is fed via line 1, means for control of flow 2, and pump 3 into scrubber vessel 4. Said scrubber vessel 4 is provided with agitating means generally illustrated at 5. Scrubber 4 recovers the excess and unreacted ammonia by the partial neutralization of the acid therein from the flow of the excess and unreacted ammonia from reactor 6, which is led via line 7 and means for control of flow 8 into scrubber 4. Simultaneously a stream of partially neutralized phosphoric acid is removed from scrubber vessel 4 via line 9 and means for control of flow generally illustrated as pump 10, and is introduced into reactor 6, together with a stream of anhydrous ammonia from a source not shown via line 11 and means for control 12 into reactor 6, wherein there is maintained under equilibrium conditions a melt of ammonium polyphosphates. In my process, the scrubber 4, in addition to recovering all of the excess and unreacted ammonia from reactor 6, removes all of the water that is removed from the process including that vaporized from the reactor, and this removal of water is generally illustrated by the arrow generally illustrating the offgassing of steam from the partially neutralized acid in scrubber 4. In addition, the offgassing of the excess ammonia and water vapor from reactor 6 and introduction of same to scrubber 4 also acts to recover substantial portions of the heat evolved from the autogenous reaction in reactor 6, which acts, in effect, to raise the temperature of the liquid in scrubber 4. The melt in reactor 6 is maintained in a state of intimate mixing by a mixing means generally illustrated as agitator 13. I have found it desirable, in many instances, that the agitator be equipped with a mechanical foam breaker to insurance the most desirable results. In addition, the melt in reactor 6 is maintained under a positive pressure and one means for maintaining said pressure within reactor 6 can easily be attained by throttling the gas flow to scrubber 4 by control means 8. I have found that pressure in the reactor provides a higher degree of ammoniation in the product at any given temperature. The product of my process is subsequently discharged from reactor 6 by line 14 and means of control of flow 15 as a melt of ammonium polyphosphates generally illustrated at 16. The product melt can subsequently be handled in any one of a number of ways to produce a desire liquid mixed fertilizer, or alternatively, it may be allowed to solidfy and later granulated for use as a solid product. These several ways in which the product, ammonium polyphosphate melt, may be further handled are shown in the drawing. As may be seen, if a liquid mixed fertilizer is desired said product melt may be dissolved directly in water, with or without the addition of more ammonia and/or supplemental materials, to yield a liquid ammonium polyphosphate fertilizer, the production of which is the objective of the present invention. Alternatively, the melt may be solidified with agitation such as obtained in a pugmill to give a granular solid ammonium polyphosphate product which may be used as a fertilizer either alone or in admixture with other materials, or which product in turn, as is shown, may be later formed into a liquid fertilizer by means of dissolving same in aqueous solution with or without additional ammonia.

From the experiments and tests to date, I have determined the following ranges of operating conditions:

| Reaction variables | Scrubber | Reactor |
|---|---|---|
| Temperature, ° F.: | | |
| Limits | 200–400 | 300–600 |
| Preferred | 250–350 | 400–500 |
| Retention time, min.: | | |
| Limits | 1–180 | 1–180 |
| Preferred | 2–60 | 2–30 |
| Pressure, p.s.i.a.: | | |
| Limits | 0.5–40 | 0.5–1,000 |
| Preferred | (¹) | 40 |
| Agitator speed, r.p.m.: | | |
| Limits | 100–3,000 | 100–3,000 |
| Preferred | 100–1,000 | 1,000–2,500 |

¹ Atmospheric.

When the product is to be used in making liquid fertilizers, the retention time in the reactor is limited by the amount of impurities (particularly iron and aluminum) in the acid. At long retention time, unsequestered solids are formed by the impurities.

In order that those skilled in the art may better understand how the present invention can be practiced, the following examples of processes I have used in the production of high-analysis liquid mixed fertilizers by the direct ammoniation of commercial grade wet-process phosphoric acids containing approximately 50–54 percent $P_2O_5$ are given by way of illustration and not by way of limitation.

Pilot-plant runs were made using two different wet-process acids produced from different uncalcined Florida phosphate rocks. An analysis of these two acids is shown below.

| Acid designation | Chemical analysis, percent by weight | | | | | |
|---|---|---|---|---|---|---|
| | Total $P_2O_5$ | $Fe_2O_3$ | $Al_2O_3$ | $SO_3$ | F | W.I. solids |
| A | 54.5 | 1.6 | 0.8 | 2.0 | 1.2 | 1.9 |
| B | 53.9 | 2.5 | 0.7 | 3.7 | 0.4 | 1.2 |

EXAMPLE I

Wet-process phosphoric acid A was fed to the scrubber at a rate of 24.4 pounds per hour. The volume of the liquid retained in the scrubber was about 1 liter. Unreacted ammonia and steam from the reactor were recycled to the scrubber. The temperature in the scrubber was 270° F. and the retention time was 10 minutes. No heat, other than heat of ammoniation and the sensible heat from the gases from the reactor, was required to give this temperature. The hot slurry from the scrubber contained 2 percent nitrogen and 57 percent $P_2O_5$. This partially ammoniated slurry was then pumped to the reactor which was operated at a temperature of 470° F., retention time of 11 minutes, and at atmospheric pressure. The volume of the liquid retained in the reactor was about 1 liter. Agitation of the melt in the reactor was provided by a six-blade turbine-type agitator equipped with a mechanical foam breaker and rotating at 2270 r.p.m. All the ammonia required for the process was fed to the reactor; 3.3 pounds of ammonia per hour were used in this test.

The product from the reactor was a viscous melt which was processed into a hard, friable solid by agitation. The solid material was crushed and sampled for analysis. The analysis showed a nitrogen content of 11.8 percent and a $P_2O_5$ content of 60.8 percent. The portion of $P_2O_5$ present in a polyphosphate form was 45 percent. Chromatographic analysis showed that the distribution of the $P_2O_5$ in the product, expressed as percent of total $P_2O_5$, was as follows: orthophosphate, 57; pyrophosphate, 33; tripolyphosphate through nonapolyphosphate, 10; and higher than nonapolyphosphate, <1. Dissolution of the product in the appropriate amounts of aqueous ammonia and water produced liquid fertilizers of 8–24–0 and 10–34–0 grades in which the impurities were well sequestered. These liquids did not salt out on storage at 75° F. and at 32° F. for 30 days.

EXAMPLE II

In a run made in a reaction apparatus similar to that described above, the following results were obtained.

Wet-process acid B

Feed rate, lb./hr.:
- Wet-process acid _____ 55.8
- Anhydrous ammonia _____ 7.8

Scrubber:
- Temperature, ° F. _____ 280
- Volume of liquid retained _____liters__ 1
- Retention time, min. _____ 4
- Liquid grade _____ 2.7–55.8–0

Reactor:
- Agitator speed, r.p.m. _____ 2270
- Pressure, p.s.i.g. _____ 2
- Volume of liquid retained ____liters__ 1
- Retention time, min. _____ 5
- Temperature, ° F. _____ 450
- Product grade _____ 11.7–57.8–0

The product discharged from the reactor contained about 30 percent of its total $P_2O_5$ in a polyphosphate form. After the melt solidified, the product was hard and friable. Liquid fertilizers of 10–34–0 and 8–24–0 grades in which the impurities were well sequestered were made with this solid product. These liquids did not salt out on storage at 75° F. and at 32° F. for 30 days.

EXAMPLE III

The results of another run made in a reaction device similar to that described in Example I are given below.

Wet-process acid A concentration, percent $P_2O_5$ __ 57.5

Feed rate, lb./hr.:
- Wet-process acid _____ 29.1
- Anhydrous ammonia _____ 3.9

Scrubber:
- Temperature, °F. _____ 280
- Volume of liquid retained _____liter__ 1
- Retention time, min. _____ 8
- Liquid grade _____ 2.5–57.2–0

Reactor:
- Agitator speed, r.p.m. _____ 2270
- Pressure, p.s.i.g. _____ 0
- Volume of liquid retained _____liter__ 1
- Retention time, min. _____ 7
- Temperature, °F. _____ 465
- Product grade _____ 11.8–61.5–0

The product discharged from the reactor contained about 39 percent of its total $P_2O_5$ in a polyphosphate form. The solidified product was hard and friable. Liquid fertilizers of 8–24–0 grade in which the impurities were well sequestered were made with this solid product. These liquids did not salt out on storage at 75° F. and at 32° F. for 30 days.

EXAMPLE IV

The results of another run made in a reaction device similar to that described in Example I are given below.

Wet-process acid A

Feed rate, lb./hr.:
- Wet-process acid _____ 29.1
- Anhydrous ammonia _____ 4.1

Scrubber:
- Temperature, °F. _____ 290
- Volume of liquid retained _____liter__ 1
- Retention time, min. _____ 8
- Liquid grade _____ 3.4–58.2–0

Reactor:
- Agitator speed, r.p.m. _____ 2270
- Pressure, p.s.i.g. _____ 0
- Volume of liquid retained _____liter__ 1
- Retention time, min. _____ 9
- Temperature, °F. _____ 445
- Product grade _____ 12.3–60.6–0

The product discharged from the reactor contained about 36 percent of its total $P_2O_5$ in a polyphosphate form. The solidified product was hard and friable. Liquid fertilizers of 8–24–0 grade in which the impurities were well sequestered were made with this solid product. These liquids did not salt out on storage at 75° F. and at 32° F. for 30 days.

EXAMPLE V

The results of another run made in a reaction device similar to that described in Example I are given below.

Test No. _____ 22

Wet-process phosphoric acid concentration, percent $P_2O_5$ _____ 50.2

Feed rate, lb./hr:
- Wet-process acid _____ 10.8
- Anhydrous ammonia _____ 1.3

Scrubber:
- Temperature, °F. _____ 235
- Volume of liquid retained _____liters__ 3
- Retention time, min. _____ 55
- Liquid grade _____ 6.0–51.7–0

Reactor:
- Agitator speed, r.p.m. _____ 900
- Pressure, p.s.i.g. _____ 0
- Volume of liquid retained _____liter__ 1
- Retention time, min. _____ 22
- Temperature, °F. _____ 425
- Product grade _____ 12.9–62.9–0

The product discharged from the reactor contained about 18 percent of its $P_2O_5$ in a polyphosphate form. After the melt solidified, it was hard and friable. Satisfactory 10–34–0 and 8–24–0 grade liquids were made from this product.

While I have shown and described particular embodiments of my invention, modifications and variations thereof will occur to those skilled in the art. I wish it to be understood therefore that the appended claims are intended to cover such modifications and variations which are within the true scope and spirit of my invention.

What I claim as new and desire to secure by Letters Patent of the United States is:

1. A process for the production of ammonium polyphosphates in a form suitable for the manufacture of high-analysis, stable solid and liquid mixed fertilizers, said ammonium polyphosphates derived from the ammoniation of wet-process phosphoric acid containing between about 1 and about 10 weight percent of metallic and other incidental impurities, said impurities comprising iron and aluminum and normally causing the formation of precipitates and gelatinous bodies in ammonium phosphates, which comprises the steps of introducing commercial grade wet-process phosphoric acid containing a maximum of approximately 54 percent $P_2O_5$ by weight into a scrubbing vessel; simultaneously introducing into said scrubbing vessel the offgas from a later mentioned reactor vessel, said offgas from said reactor vessel comprising vapors of water and unreacted ammonia; and said offgas introduction into said scrubber vessel causing the heating and preneutralization of the wet-process phosphoric acid introduced therein; simultaneously removing a portion of the partially neutralized wet-process phosphoric acid from said scrubber vessel and introducing said stream into a reactor vessel; simultaneously introducing a stream of anhydrous ammonia into said reactor vessel; maintaining in said reactor vessel a melt of ammonium polyphosphates resulting from the reaction of said stream of anhydrous ammonia and said stream of partially neutralized wet-process phosphoric acid; continuously agitating the melt of ammonium polyphosphate in said reactor vessel and causing the intimate mixing of the streams of partially neutralized wet-process phosphoric acid and anhydrous ammonia with said melt; maintaining the melt in said reactor vessel under a pressure in the range from about 15 p.s.i.a. to about 1000 p.s.i.a. and at a temperature in the range from about 300° F. to about 600° F.; and withdrawing as product from said reactor vessel a melt of ammonium polyphosphates suitable for the subsequent preparation of solid and liquid mixed fertilizers.

2. A process for the production of ammonium polyphosphates in a form suitable for the manufacture of high-analysis, stable solid and liquid mixed fertilizers, said ammonium polyphosphates derived from the ammoniation of wet-process phosphoric acid containing between about 1 and about 10 weight percent of metallic and other incidental impurities, said impurities comprising iron and aluminum and normally causing the formation of precipitates and gelatinous bodies in ammonium phosphates, which comprises the steps of introducing commercial grade wet-process phosphoric acid containing a maximum of approximately 54 percent $P_2O_5$ by weight into a scrubbing vessel; simultaneously introducing into said scrubbing vessel the offgas from a later mentioned reactor vessel, said off gas from said reactor vessel comprising vapors of water and unreacted ammonia; and said offgas introduction into said scrubber vessel causing the heating and preneutralization of the wet-process phosphoric acid introduced therein; maintaining the resulting preneutralized wet-process phosphoric acid in said scrubber vessel under a pressure from about 0.5 p.s.i.a. to about 40 p.s.i.a. and at a temperature in the range from about 200° F. to about 400° F.; simultaneously removing a portion of the partially neutralized wet-process phosphoric acid from said scrubber vessel and introducing said stream into a reactor vessel; simultaneously introducing a stream of anhydrous ammonia into said reactor vessel; maintaining in said reactor vessel a melt of ammonium polyphosphates resulting from the reaction of said stream of anhydrous ammonia and said stream of partially neutralized wet-process phosphoric acid; continuously agitating the melt of ammonium polyphosphate in said reactor vessel and causing the intimate mixing of the streams of partially neutralized wet-process phosphoric acid and anhydrous ammonia with said melt; maintaining the melt in said reactor vessel under a pressure in the range from about 15 p.s.i.a. to about 1000 p.s.i.a. and at a temperature in the range from about 300° F. to about 600° F.; and withdrawing as product from said reactor vessel a melt of ammonium polyphosphates suitable for the subsequent preparation of liquid mixed and solid fertilizers.

3. A process for the production of ammonium polyphosphates in a form suitable for the manufacture of high-analysis, stable solid and liquid mixed fertilizers, said ammonium polyphosphates derived from the ammoniation of wet-process phosphoric acid containing between about 1 and about 10 weight percent of metallic and other incidental impurities, said impurities comprising iron and aluminum and normally causing the formation of precipitates and gelatinous bodies in ammonium phosphates, which comprises the steps of introducing commercial grade wet-process phosphoric acid containing a maximum of approximately 54 percent $P_2O_5$ by weight into a scrubbing vessel; simultaneously introducing into said scrubbing vessel the offgas from a later mentioned reactor vessel, said offgas from said reactor vessel comprising vapors of water and unreacted ammonia; and said offgas introduction into said scrubber vessel causing the heating and preneutralization of the wet-process phosphoric acid introduced therein; maintaining the resulting preneutralized wet-process phosphoric acid in said scrubber vessel under a pressure from about 15 p.s.i.a. to about 40 p.s.i.a. and at a temperature in the range from about 250° F. to about 350° F.; simultaneously removing a portion of the partially neutralized wet-process phosphoric acid from said scrubber vessel and introducing said stream into a reactor vessel; simultaneously introducing a stream of anhydrous ammonia into said reactor vessel; maintaining in said reactor vessel a melt of ammonium polyphosphates resulting from the reaction of said stream of anhydrous ammonia and said stream of partially neutralized wet-process phosphoric acid; continuous agitating the melt of ammonium polyphosphate in said reactor vessel and causing the intimate mixing of the streams of partially neutralized wet-process phosphoric acid and anhydrous ammonia with said melt; maintaining the melt in said reactor vessel under a pressure in the range from about 15 p.s.i.a. to about 300 p.s.i.a. and at a temperature in the range from about 400° F. to about 500° F.; and withdrawing as product from said reactor vessel a melt of ammonium polyphosphates suitable for the subsequent preparation of solid and liquid mixed fertilizers.

4. A process for the production of ammonium polyphosphates in a form suitable for the manufacture of high-analysis, stable solid and liquid mixed fertilizers, said ammonium polyphosphates derived from the ammoniation of wet-process phosphoric acid containing between about 1 and about 10 weight percent of metallic and other incidental impurities, said impurities comprising iron and aluminum and normally causing the formation of precipitates and gelatinous bodies in ammonium phosphates, which comprises the steps of introducing commercial grade wet-process phosphoric acid containing a maximum of approximately 54 percent $P_2O_5$ by weight into a scrubbing vessel; simultaneously introducing into said scrubbing vessel the offgas from a later mentioned reactor vessel, said offgas from said reactor vessel comprising vapors of water and unreacted ammonia; and said offgas introduction into said scrubber vessel causing the heating and preneutralization of the wet-process phosphoric acid introduced therein; maintaining the resulting preneutralized wet-process phosphoric acid in said scrubber vessel under a pressure of about 15 p.s.i.a. and at a temperature of about 275° F.; simultaneously removing a portion of the partially neutralized wet-process phosphoric acid from said scrubber vessel and introducing said stream into a reactor vessel; simultaneously introducing a stream of anhydrous ammonia into said reactor vessel; maintaining in said reactor vessel a melt of ammonium polyphosphates resulting from the reaction of said stream of anhydrous ammonia and said stream of partially neutralized wet-process phosphoric acid; continuously agitating the melt of ammonium polyphosphate in said reactor vessel and causing the intimate mixing of the streams of partially neutralized wet-process phosphoric acid and anhydrous ammonia with said melt; maintaining the melt in said reactor vessel under a pressure of about 40 p.s.i.a. and at a temperature of about 470° F.; and withdrawing as product from said reactor vessel a melt of ammonium polyphosphates suitable for the subsequent preparation of solid and liquid mixed fertilizers.

5. The process of claim 2 wherein the melt is retained in said reactor vessel for a period in the range of about 1 to 180 minutes.

6. The process of claim 3 wherein the melt is retained in said reactor vessel for a period in the range of about 2 to 30 minutes.

7. The process of claim 4 wherein the melt is retained in said reactor vessel for a period of approximately 10 minutes.

8. The process of claim 2 wherein said product ammonium polyphosphate melt is introduced into a second reaction vessel, together with a stream of aqua ammonia; is intimately mixed therewith; and is withdrawn from said reaction vessel as a high-analysis, stable liquid fertilizer product containing a total plant food content ($N+P_2O_5$) in the range from upwards of about 45 percent by weight.

References Cited
UNITED STATES PATENTS

| | | | |
|---|---|---|---|
| 3,301,657 | 1/1967 | Dee et al. | 71—41 X |
| 2,033,388 | 3/1936 | Moose | 23—106 |
| 2,963,359 | 12/1960 | Moore et al. | 71—43 |
| 3,153,574 | 10/1964 | Achorn et al. | 71—43 |
| 3,199,973 | 8/1965 | Moore | 71—43 |
| 3,201,195 | 8/1965 | Huber et al. | 71—43 |
| 3,228,752 | 1/1966 | Hignett et al. | 71—34 |
| 3,249,421 | 5/1966 | Bigot et al. | 71—43 |

DONALL H. SYLVESTER, *Primary Examiner.*

T. D. KILEY, R. BAJEFSKY, *Assistant Examiners.*